Dec. 5, 1950  J. E. TOM  2,532,580
POWER GARDEN TRACTOR
Filed July 25, 1946  2 Sheets-Sheet 1

INVENTOR.
JOHN E. TOM
BY Bates, Teare, & McBean
ATTORNEYS

Dec. 5, 1950 J. E. TOM 2,532,580
POWER GARDEN TRACTOR

Filed July 25, 1946 2 Sheets-Sheet 2

INVENTOR.
JOHN E. TOM
BY Bates, Teare, & McBean
ATTORNEYS

Patented Dec. 5, 1950

2,532,580

UNITED STATES PATENT OFFICE 2,532,580

POWER GARDEN TRACTOR

John E. Tom, East Cleveland, Ohio, assignor, by mesne assignments, to Earl Realty Company, Cleveland, Ohio, a corporation of Ohio Application July 25, 1946, Serial No. 686,226

5 Claims. (Cl. 97—48)

This invention relates to farm and garden equipment and particularly to a cultivator that is mounted upon a two-wheel power driven tractor.

Heretofore two-wheeled power driven tractors have been used for actuating a cultivator, but the usual practice has been to mount the cultivator at the rear of the tractor, but inasmuch as the tractors are usually guidable by an operator who walks behind the tractor, considerable difficulty has been experienced in manipulating the tractor so as to make the shovels on the cultivator sufficiently maneuverable to avoid dislocating a plant that may not be growing exactly in line with the remaining plants in the row. Moreover, the cultivator frame usually extends beyond the outer confines of the tractor wheels, and fairly close to the region of the guiding handles, wherefore, some difficulty has been experienced in making a turn at the end of a row.

An object of the present invention is to mount a cultivator at the front end of a two-wheeled power driven tractor, whereby the operator can quickly maneuver the tractor to guide the cultivator shovels to the right or left in a more expeditious manner than could be attained by mounting the cultivator at the rear of the tractor.

An additional object of the invention is to make a connection between the tool frame and cultivator frame so as to allow oscillation of the cultivator frame to a limited extent with respect to the tool frame. The invention also contemplates a construction by means of which the tool frame may be detachably connected to the tractor frame in a quick and easy manner.

Figure 1:
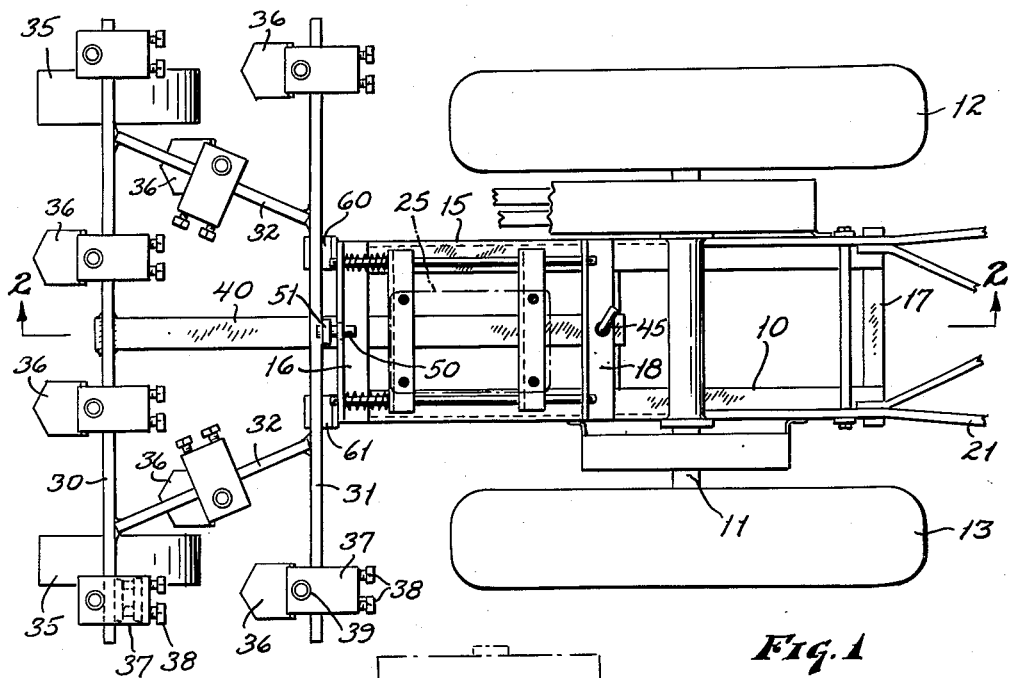
Figure 2:
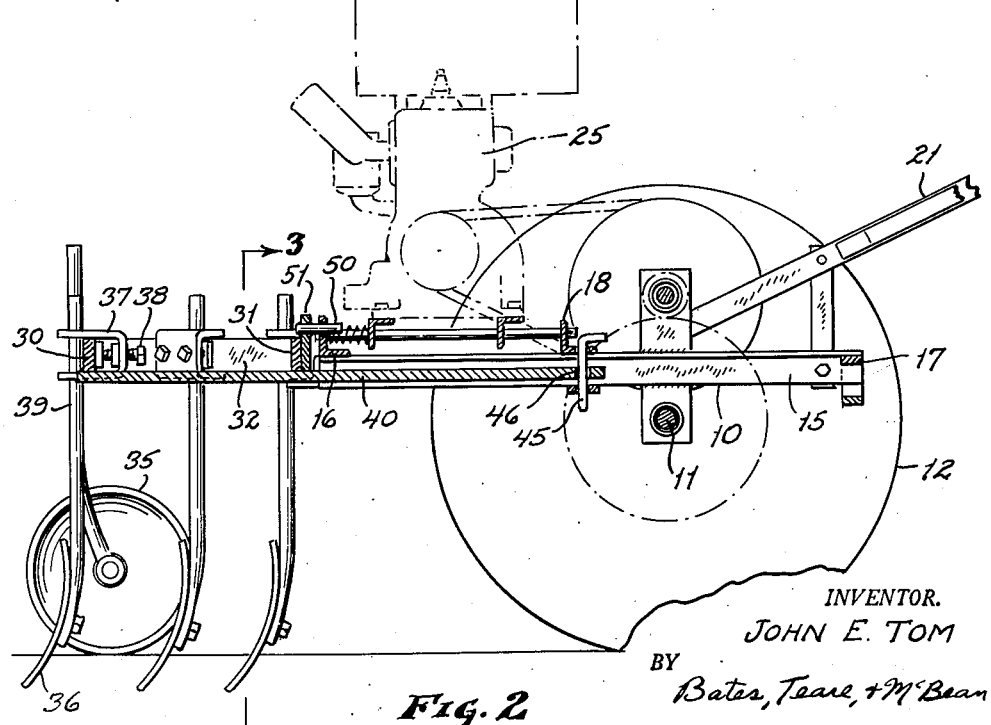
Figure 3:
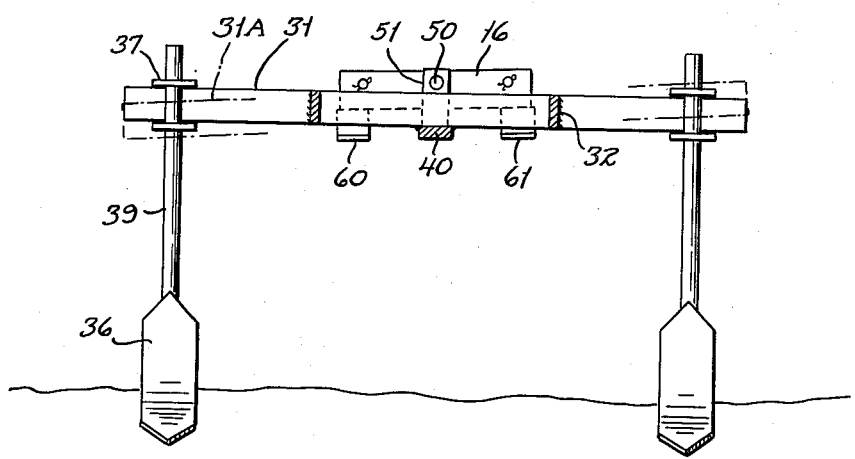
Figure 4:
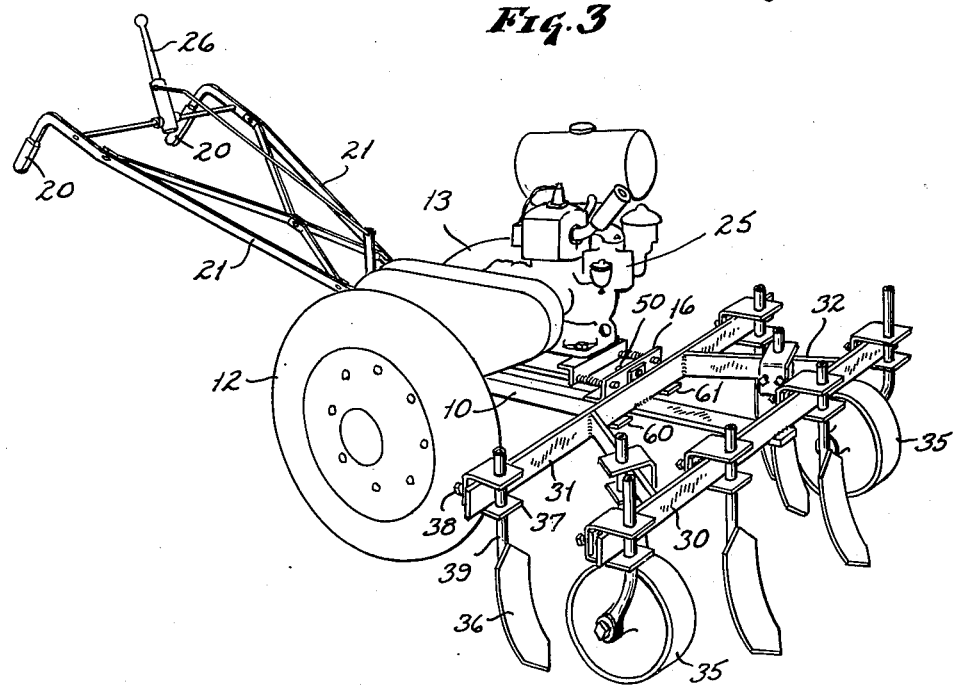

Referring to the drawings, Fig. 1 is a top plan view of a tractor having a cultivator mounted at the front end thereof in accordance with the present invention; Fig. 2 is a section taken on a plane indicated by the line 2—2 in Fig. 1; Fig. 3 is a section taken on a plane indicated by the line 3—3 in Fig. 2, and Fig. 4 is a perspective view of the tractor with the cultivator attached thereto.

In the drawings, I have shown a two-wheeled tractor which includes a frame, indicated in general at 10, upon which is journalled an axle 11 which supports wheels 12 and 13. The frame preferably comprises longitudinally extending side members 15 that are connected by transversely extending end members 16 and 17 at the front and rear ends respectively and that are also connected by a cross-member 18 that is disposed adjacent the central portion of the frame, but forwardly of the axle.

The tractor is guided by handles 20 which form the terminal portions of bars 21 that are attached to the frame and extend upwardly from the rearward end thereof. Power for operating the tractor may be obtained from a gasoline motor indicated in general at 25 that is supported upon the frame, while a suitable control for the power connection between the motor and the tractor wheels is indicated at 26 adjacent the handles 20.

The present invention contemplates the mounting of a cultivator forwardly of the tractor frame, and accordingly, I have shown a cultivator frame which comprises front and rear bars 30 and 31 which are connected by diagonally extending cross-bars 32. The bars constitute a frame which supports ground-engaging wheels 35 and also cultivator shovels 36, each of which may be adjustably positioned on a bar by means of a yoke 37 and set screws 38 that clamp a shank 39 to one of the bars. Such connection enables the shovels and wheels to be adjustably positioned on the tool frame in accordance with the spacing of the rows to be cultivated.

To mount the tool frame upon the tractor frame, I utilize a straight bar 40, the forward end of which may be connected, as by welding, to the bar 30, and the intermediate portion of which is rigidly connected, as by welding, to the bar 31. The bar 40 extends rearwardly of the tool frame in the form of a tongue and centrally of the tractor frame and terminates adjacent the cross-bar 18 to which it is detachably connected by means of a pin 45. The pin has a loose fit in an opening 46 in the bar so as to allow a limited movement of the bar with respect to the tractor frame. In addition, the tool frame is pivotally mounted to the tractor frame by a pin 50 which extends through the cross-bar 16, and also through an ear 51 that is rigidly attached to the bar 31 and projects upwardly from the bar 40. The arrangement is such that the tool frame may oscillate about the axis of the pivot pin 50 to accommodate unevenness of the ground over which the cultivator is moving.

The extent of permissible oscillation of the tool frame with respect to the tractor frame is governed by the pads 60 and 61 which are rigidly attached to the tractor frame adjacent the forward ends of the longitudinal bars thereof. Normally, the pads are disposed below the bottom of the bar 31 when the tool frame is in a horizontal position with respect thereto. Fig. 3, for example, in full line shows the tool frame in one position with respect to the tractor frame and shows another position by the broken line 31A. The extent of oscillation is, as aforesaid, limited by engagement of either pad 60 or 61 at the bottom of the bar 31.

As shown in the drawings, the preferred arrangement provides clearance between the ear 51 and the end member 16 as a result of which the driving thrust is taken up by the pin 45 at a point near the center of the tractor frame. Such arrangement aids materially in reducing the strains that normally would be set up in the frame if the driving thrust were taken by the forward end of the tractor frame.

An advantage of mounting the cultivator at the front end of the tractor is that the operator can see the points of contact between the shovels and ground more readily than is the case when the cultivator is mounted at the rearward end of the cultivator, and thus, he can guide the cultivator more accurately. A further advantage of having the cultivator in front of the tractor is the fact that the shovels are more responsive to a slight movement of the guiding handles than would be the case when the cultivator is mounted at the rear of the tractor. Moreover, the use of a connection between the tool and tractor frame that allows limited oscillation of the tool frame with respect to the tractor frame minimizes undue strain on the tractor frame and reduces the effort required to guide the tractor during the cultivating operation.

I claim:

1. In a power driven two-wheeled tractor having a frame comprising longitudinally extending side members and transversely extending end members and a third cross-member disposed adjacent the mid-portion of the frame, a tool frame disposed forwardly of the tractor frame and having a tongue pivotally mounted at an intermediate point on the tongue to one of the end members and loosely but detachably connected beyond said intermediate point to the third cross-member.

2. In a two-wheeled power driven tractor having a frame including longitudinally extending side members, transversely extending end members and a transversely extending cross-member disposed adjacent the mid-portion of the frame, a tool frame disposed forwardly of the tractor frame and having a tongue pivotally connected with the forward end member adjacent the mid-portion thereof and loosely connected with the tractor frame adjacent the intermediate transversely extending member, and an abutment carried by the tractor frame and disposed adjacent the forward edge of the longitudinally extending members to limit movement of the tool frame with respect to the tractor frame about such pivotal connection.

3. In a two-wheeled power driven tractor having a frame, a tool frame comprising a pair of parallel bars, a centrally disposed bar rigidly attached to the parallel bars and extending transversely thereof, said last-mentioned bar projecting beyond the rearward end of the tool frame and terminating adjacent the mid-portion of the tractor frame, a loosely fitting pin providing a detachable connection between the tractor frame and the terminating end of said last-mentioned bar, and another pin providing a pivotal connection between said last-mentioned bar at an intermediate point thereof and the tractor frame, the pivotal connection being disposed adjacent the forward end of the tractor frame, and an abutment on the tractor frame for limiting the pivotal movement of the tool frame with respect to the tractor frame.

4. In a two-wheeled power driven tractor, a frame projecting forwardly of the tractor wheels, an earth-engaging tool having a frame disposed forwardly of the tractor frame and having a tongue pivotally connected to the forward end of the tractor frame to provide a limited extent of oscillation of the tool frame with respect to the tractor frame on an axis extending longitudinally of the frame, said tongue having another connection to the tractor frame beyond said pivotal connection, one of said frames having an abutment on either side of said longitudinal axis adapted to resist excess movement of the tool frame on that side of said axis.

5. A two-wheeled power driven tractor having a frame, a tool frame disposed in front of the tractor frame, said tool frame having a bar extending rearwardly thereof and beyond the forward end of the tractor frame, said tool frame being pivotally connected to the tractor frame adjacent the forward end thereof, means for loosely connecting the rearward end of the bar to the tractor frame, one of said frames having an abutment on either side of said longitudinal axis adapted to resist excess movement of the tool frame on that side of said axis.

JOHN E. TOM.

REFERENCES CITED

The following references are of record in the file of this patent:

UNITED STATES PATENTS

| Number | Name | Date |
| --- | --- | --- |
| 1,556,508 | Hentzell et al. | Oct. 6, 1925 |
| 1,653,118 | Pellette | Dec. 20, 1927 |
| 1,701,638 | Rowland | Feb. 12, 1929 |
| 1,743,291 | Thill | Jan. 14, 1930 |
| 1,806,728 | Willits | May 26, 1931 |
| 2,244,099 | Chase | June 3, 1941 |
| 2,250,391 | Ober | July 22, 1941 |
| 2,345,741 | Foulke | Apr. 4, 1944 |